(12) United States Patent
Sakai et al.

(10) Patent No.: US 6,515,614 B2
(45) Date of Patent: Feb. 4, 2003

(54) AUTONOMOUS MOVING APPARATUS HAVING OBSTACLE AVOIDANCE FUNCTION

(75) Inventors: Tatsuo Sakai, Osaka (JP); Yukihiko Kitano, Hyogo (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 09/973,896

(22) Filed: Oct. 11, 2001

(65) Prior Publication Data
US 2002/0075180 A1 Jun. 20, 2002

(30) Foreign Application Priority Data
Oct. 26, 2000 (JP) ...................... P2000-327760

(51) Int. Cl.[7] ............................... G01S 13/93
(52) U.S. Cl. ............................ 342/70; 342/52; 342/53; 342/61; 342/195; 701/300; 701/301; 180/167; 180/169
(58) Field of Search ................... 342/52–58, 61–66, 342/69–72, 147, 158, 175, 195, 13, 29, 42; 340/435; 701/300, 301, 302; 180/167, 168, 169

(56) References Cited

U.S. PATENT DOCUMENTS

| | | | | |
|---|---|---|---|---|
| 3,501,762 A | * | 3/1970 | Klees | 342/53 |
| 3,568,185 A | * | 3/1971 | Page | 342/53 |
| 3,934,250 A | * | 1/1976 | Martin, Jr. | 342/42 |
| 5,122,801 A | * | 6/1992 | Hughes | 342/13 |
| 5,315,363 A | * | 5/1994 | Nettleton et al. | 342/29 |
| 5,530,651 A | * | 6/1996 | Uemura et al. | 701/301 |
| 6,055,042 A | * | 4/2000 | Sarangapani | 342/71 |
| 6,079,862 A | | 6/2000 | Kawashima et al. | |
| 6,281,786 B1 | | 8/2001 | Adachi et al. | |

FOREIGN PATENT DOCUMENTS

| | | | | |
|---|---|---|---|---|
| EP | 0036333 A1 | * | 9/1981 | G01S/13/93 |
| JP | 7-49381 A | | 2/1995 | G01S/15/88 |

* cited by examiner

*Primary Examiner*—Bernarr E. Gregory
(74) *Attorney, Agent, or Firm*—Greenblum & Bernstein, P.L.C.

(57) ABSTRACT

An autonomous moving apparatus moving to a destination while detecting and avoiding an obstacle includes a radar device for scanning a horizontal plane in its travelling direction to thereby detect a position of an obstacle and an obstacle sensor for detecting an obstacle in a space different from the scanning plane of the radar device. The apparatus moves to the destination under such control as to avoid the obstacle based on detection information from the radar device and the obstacle sensor from a detection output provided by a specific-configuration detecting element for detecting a present specific configuration from scanning information by the radar device. By providing such a specific-configuration detecting element that detects a specific configuration based on the scan information by the radar device that can accurately know about position information, it is possible to guess an obstacle having an upper structure, thus providing efficient avoidance.

17 Claims, 14 Drawing Sheets

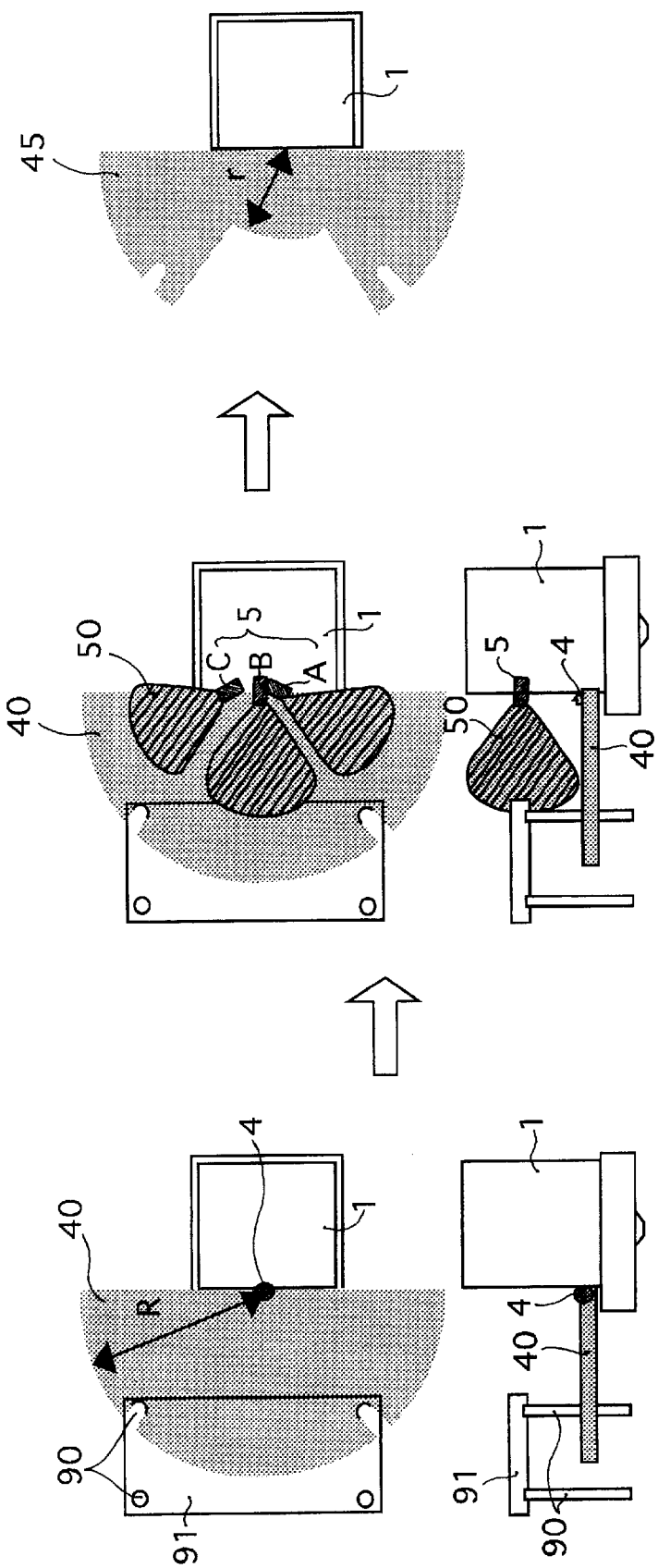

AUTONOMOUS MOVING APPARATUS HAVING OBSTACLE AVOIDANCE FUNCTION

BACKGROUND OF THE INVENTION

The invention relates to an autonomous moving apparatus performing required operations such as movement while detecting and avoiding an obstacle.

There are available two methods of providing an autonomous moving apparatus with an obstacle detecting element for avoiding an obstacle: by using a supersonic or infrared sensor as the obstacle detecting element or by using as it a radar device for scanning a horizontal plane.

To detect an obstacle with the former obstacle detecting element, that is, with a supersonic or infrared sensor, however, many sensors each having a small detection area need to be arranged in order to accurately detect the position of an obstacle in a wide detection area (see Japanese Unexamined Patent Publication No. 7-49381).

As shown in FIG. 15(a), for example, in an autonomous moving apparatus 1 mounted with an obstacle sensor 5 utilizing a supersonic wave or an infrared ray and the sensor 5 having a wide detection area 50, a wide detection area is detected by few sensors 5. With only one sensor 5 alone, however, an obstacle 9, even if detected by it, cannot be decided on whether it is located at a position e or f. This means that the obstacle cannot clearly be recognized and so cannot be avoided efficiently both in direction and in distance.

Even if the sensor 5 with the small detection area 50 is arranged many as shown in FIG. 15(b), such a small obstacle 9 as indicated by a reference sign g may be missed and also such an obstacle 9 indicated by a reference sign h cannot be detected that would not reflect a supersonic wave or an infrared ray toward a receiving element. To guard against this, as shown in FIG. 15(c), it is necessary to arrange many sensors such as a sensor 5' that bridges the gap between the detection areas 50 or a sensor 5" that has a different detection angle. Such an arrangement of many sensors, however, not only increases the costs but also needs complicated processing to eliminate interference between the sensors.

If, as shown in FIG. 16, such a radar device 4 having a detection area 40 is used that scans a horizontal plane in a range of, for example, 180°, on the other hand, it is possible to accurately detect an obstacle in position and distance. If the obstacle 9 happens to be a chair or a table and therefore only its leg 90 is spotted on a scanning surface, the radar device 4 can recognize the leg 90 but not an upper structure 91 of the obstacle 9 such as a roof. Accordingly, the autonomous moving apparatus 1 decides that it can pass through between the legs 90 and so moves straightly without avoiding it, thus eventually collide with the upper structure 91. "L" in the figure indicates a set distance (radius) within which an obstacle can be detected.

If an obstacle detecting element by use of the first optional supersonic or infrared sensor and that by use of the second optional radar device are only combined, collision with an obstacle can be avoided but the problem of an inefficiency inherent to the former detecting element cannot be avoided in avoiding an obstacle that can be detected by it.

SUMMARY OF THE INVENTION

In view of the above, it is an object of the present invention to provide an autonomous moving apparatus that can surely detect an obstacle and, moreover, can avoid it efficiently.

An autonomous moving apparatus according to the present invention moving to a destination while detecting an obstacle and avoiding it includes a scan-type sensor for scanning a horizontal plane in the travelling direction to detect a position of an obstacle, a non-scan-type sensor for detecting, without scanning, an obstacle in a space different from the scanning plane of the scan-type sensor, an obstacle detecting element for always detecting an obstacle based on detection information from the scan-type sensor and, when an obstacle was detected by the scan-type sensor, operating the non-scan-type sensor to thereby guess the position of the obstacle based on the detection information from both the scan-type and non-scan-type sensors, and a controller for controlling travelling to a destination based on a position of the obstacle detected by the obstacle detecting element.

By this aspect of the present invention, only when an obstacle was detected by the scan-type sensor, the, non-scan-type sensor is activated so that the position of the obstacle may be guessed on the basis of detection information from both the scan-type and non-scan-type sensors, thus enabling efficient detection as compared to an approach whereby the detection information from both sensors is used always.

Another autonomous moving apparatus according to the present invention moving to a destination while detecting an obstacle and avoiding it includes a scan-type sensor for scanning a horizontal plane in a travelling direction to detect a position of an obstacle, a non-scan-type sensor for detecting, without scanning, an obstacle in a space different from the scanning plane of the scan-type sensor, a specific-configuration detecting element for guessing a shape of a detected object based on its distance information for each scanning angle of the scan-type sensor to thereby detect a set specific configuration, an obstacle detecting element for guessing a position of an obstacle based on detection information from both the scan-type and non-scan-type sensors if a specific configuration was detected by the specific-configuration detecting element and, otherwise, guessing the position of the obstacle based on only the detection information from the scan-type sensor, and a controller for controlling travelling toward a destination based on a detected position of the obstacle obtained from the obstacle detecting element.

By this aspect of the present invention, when the specific-configuration detecting element guessed a shape of a detected object based on information of a distance of the detected object sent from the scan-type sensor to thereby detect a specific configuration, the position of the obstacle is guessed based on the detection information from both the scan-type and non-scan-type sensors. Thus, the non-scan-type sensor is activated only in a region which have therein such an obstacle that cannot be detected only by the scan-type sensor to thereby guess a specific configuration of obstacle and efficiently detect it, thus enabling avoiding the obstacle surely and efficiently.

Also, if the non-scan-type sensor is active always, it may recognize an obstacle in its detection area even when it exists only at an edge of that area. Accordingly, for example, the apparatus problematically decides it cannot pass through a narrow passage between a wall and an obstacle even when there is a space therebetween wide enough to pass through. Such a problem can be solved by the invention, by which only the scan-type sensor is activated in such a case.

The specific-configuration detecting element has a memory for storing beforehand the information required to detect a columnar object as a specific configuration so that based on a series of detected object distance data pieces obtained from the scan-type sensor it can recognize a shape given by this data as a specific configuration when a difference between distances indicated by the adjacent data pieces is within a range set in the memory, a width of the detected object guessed from the data is within a range set in the memory, and a distance indicated by data pieces on both sides of this guessed object's data is larger than a distance set in the memory and also continues as long as at least a width set in the memory. Thus, the columnar object can be detected as a specific configuration, thus detecting an object including a chair or a table with legs that has a roof overhung in the air.

The obstacle detecting element guesses the position of an obstacle based on detection information from both the scan-type and non-scan-type sensors if the distance with respect to a specific configuration of the obstacle detected by the specific-configuration detecting element is smaller than a value set in the memory and, otherwise or if no specific configuration was detected, guesses the position of the obstacle based on only the detection information from the scan-type sensor. Thus, when the distance with respect to an object with a specific configuration is large or no specific configuration of object cannot be detected, only the scan-type sensor is used in detection, thus enabling avoiding the obstacle efficiently.

The obstacle detecting element activates the non-scan-type sensor when the specific-configuration detecting element provides a detection output. Thus, power dissipation can be reduced at the non-scan-type sensor.

BRIEF DESCRIPTION OF THE DRAWINGS

FIGS. 14(a), 14(b), and 14(c) are illustrations for explaining operations of the autonomous moving apparatus to recognize the specific configuration of object.

DETAILED DESCRIPTION OF THE PREFERRED EMBODIMENT OF THE-PRESENT INVENTION

Figure 1:
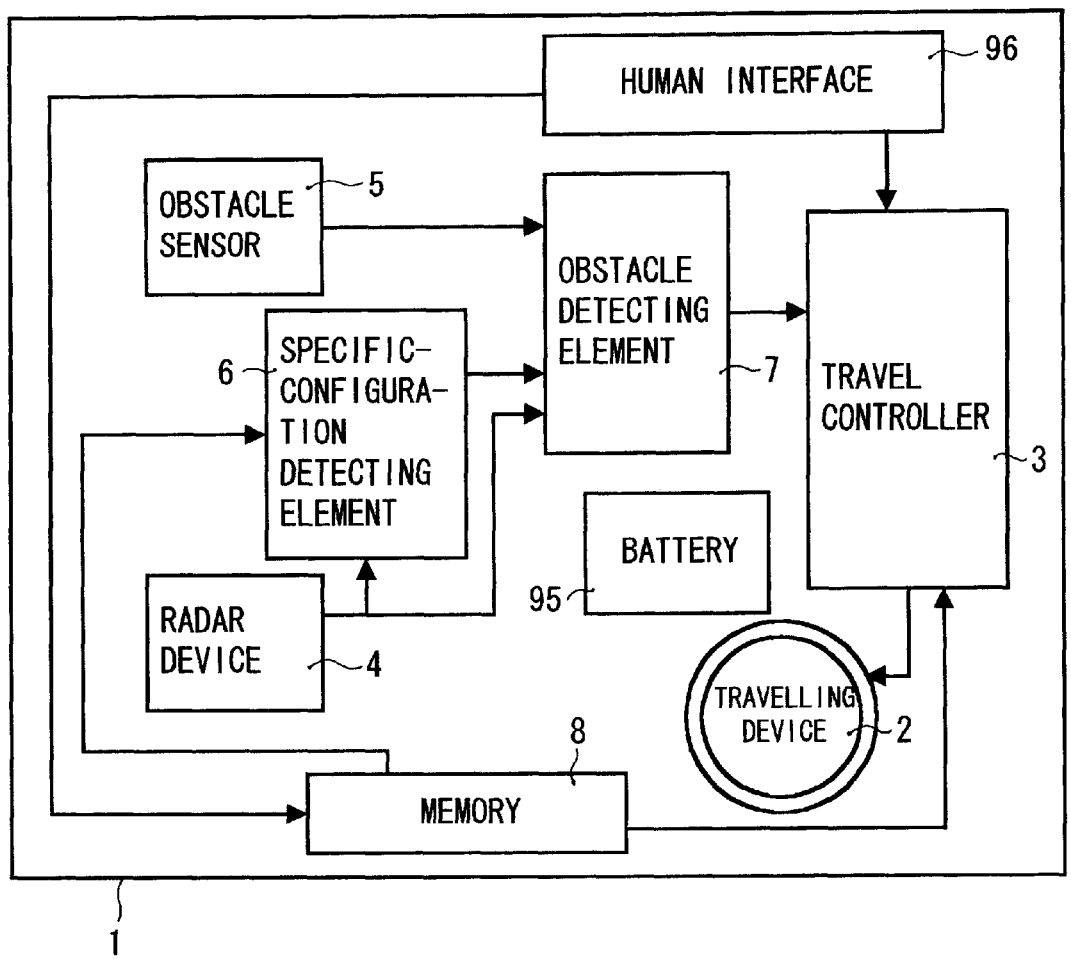
FIG. 1 is a block diagram for showing an autonomous moving apparatus according to one embodiment of the present invention.

The following will describe one example of an embodiment of the invention. FIG. 1 is a block diagram for showing an autonomous moving apparatus 1 of the invention. The autonomous moving apparatus 1 includes a travelling device 2 capable of travelling and steering, a travel controller 3 for controlling the travelling device 2, a scan-type sensor (hereinafter called radar device) 4 comprised of a radar etc. for scanning a horizontal plane in a travelling direction of the travelling device 2 to thereby detect an obstacle, a non-scan-type sensor (hereinafter called obstacle sensor) 5 comprised of a supersonic or infrared sensor for detecting an obstacle in a space different from the scanning plane of the radar device 4, a specific-configuration detecting element 6, an obstacle detecting element 7, and a memory 8.

The specific-configuration detecting element 6 serves to detect a set specific configuration based on information obtained from the radar device 4 which scans a scanning plane. The obstacle detecting element 7 sums up outputs of the radar device 4, the obstacle sensor 5, and the specific-configuration detecting element 6 to thereby detect an object, information about which is utilized by the travel controller 3 to control the travelling device 2 so that it may steer for a target position avoiding the obstacle. The memory 8 stores beforehand positions of a target position and features of specific configurations. The autonomous moving apparatus 1 further includes a power supply 95 and a human interface 96 for inputting to the memory 8 a setting of a target position and features of specific configurations.

Figure 2:
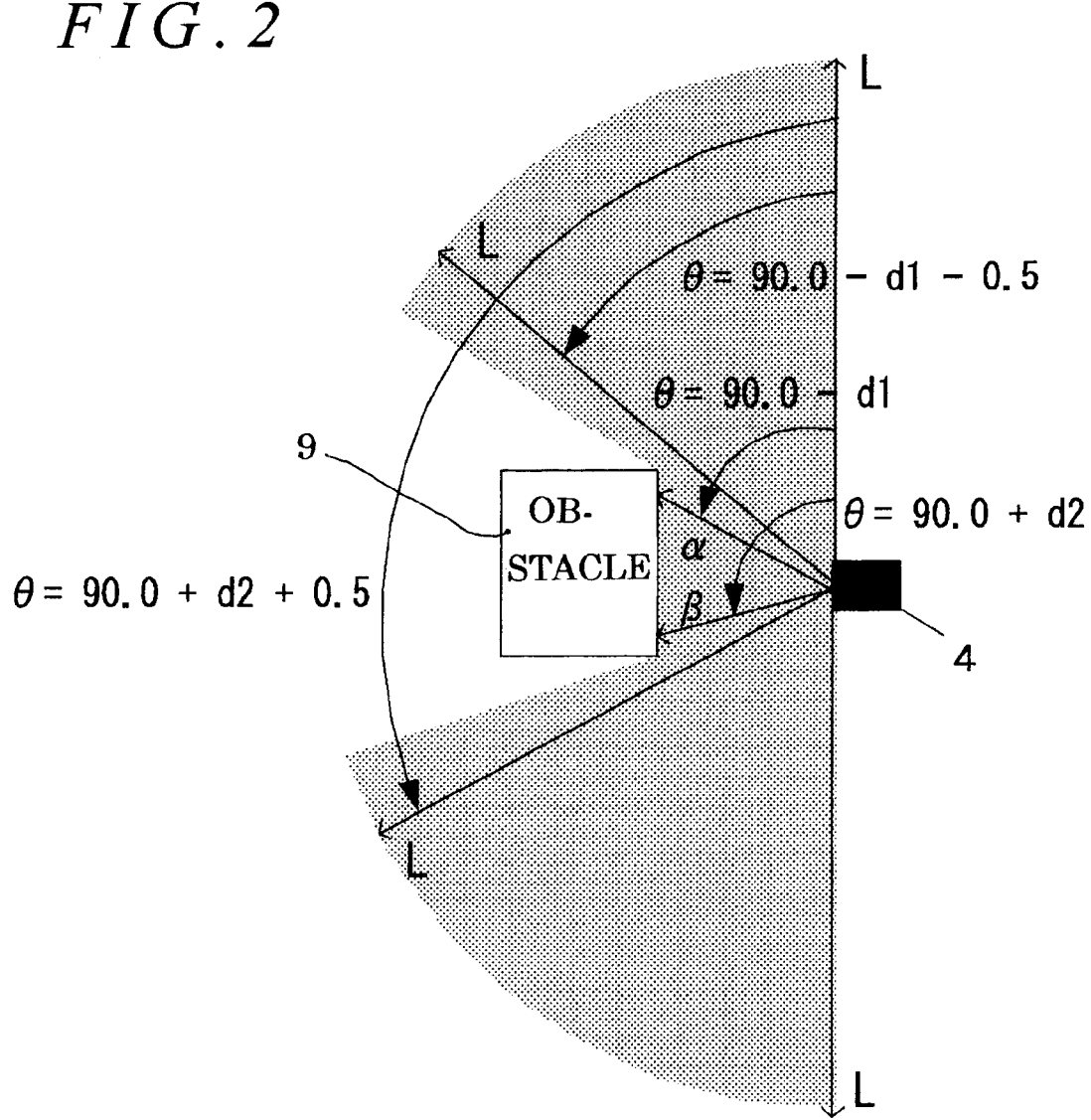
FIG. 2 is an illustration for explaining operations of a radar device of the autonomous moving apparatus.

The radar device 4 scans, as shown in FIG. 2, for example, a horizontal plane in a forward travelling direction within a range of 180° and, at the same time, measures a distance for each 0.5° of this 180°-range, thus outputting data such as given in a table below if it spots an obstacle 9 in its front (of about 90°). In the table, L indicates a distance set in the radar device 4, so that it means that within a range of an angle having an output of the distance L is there no obstacle. The values of d1 and d2 depend on the size and the position of an obstacle 9. α and β indicate a distance with respect to the obstacle 9.

TABLE 1

| Angle θ (°) | Distance |
|---|---|
| 0.0 | L |
| 0.5 | L |
| 1.0 | L |
| 1.5 | L |
| 2.0 | L |
| . . . | . . . |
| 90.0 − d1 − 0.5 | L |
| 90.0 − d1 | α |
| . . . | . . . |
| 90.0 + d2 | β |
| 90.0 + d2 + 0.5 | L |
| . . . | . . . |
| 178.0 | L |
| 178.5 | L |
| 179.0 | L |
| 179.5 | L |
| 180.0 | L |

Figure 3:
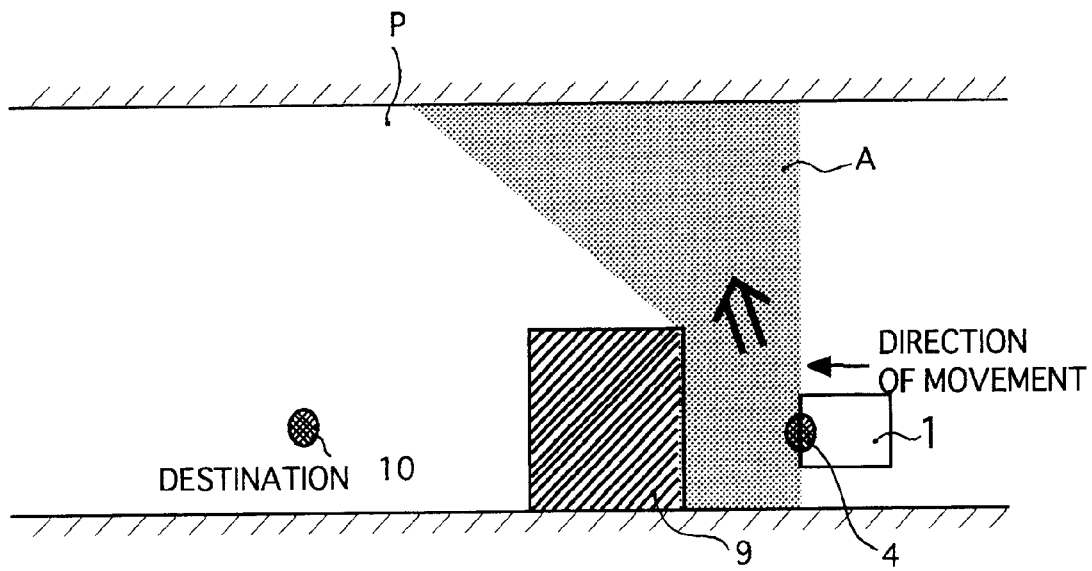
FIG. 3 is an illustration for explaining basic operations of the autonomous moving apparatus when it detects an obstacle.

In this embodiment, an obstacle detecting distance by the radar device 4 is set longer than that by the obstacle sensor 5. Accordingly, the autonomous moving apparatus 1 moves toward a destination mainly based on detection by the radar device 4. Here, supposed that, as shown in FIG. 3, the obstacle 9 was detected by the radar device 4 in a travelling directional front of the autonomous moving apparatus 1 when it is passing through a passage P between opposite walls toward a destination 10. A dotted area A is considered to have no wall nor obstacle 9 therein as spotted on the radar device 4. Suppose also that the travel controller 3 once changes its travelling direction to the right forward side toward this area considered to have no obstacle 9 therein to avoid it. This operation is performed by the travel controller 3 when it controls the travelling device 2 based on detection information of the obstacle detecting element 7.

Figure 4:
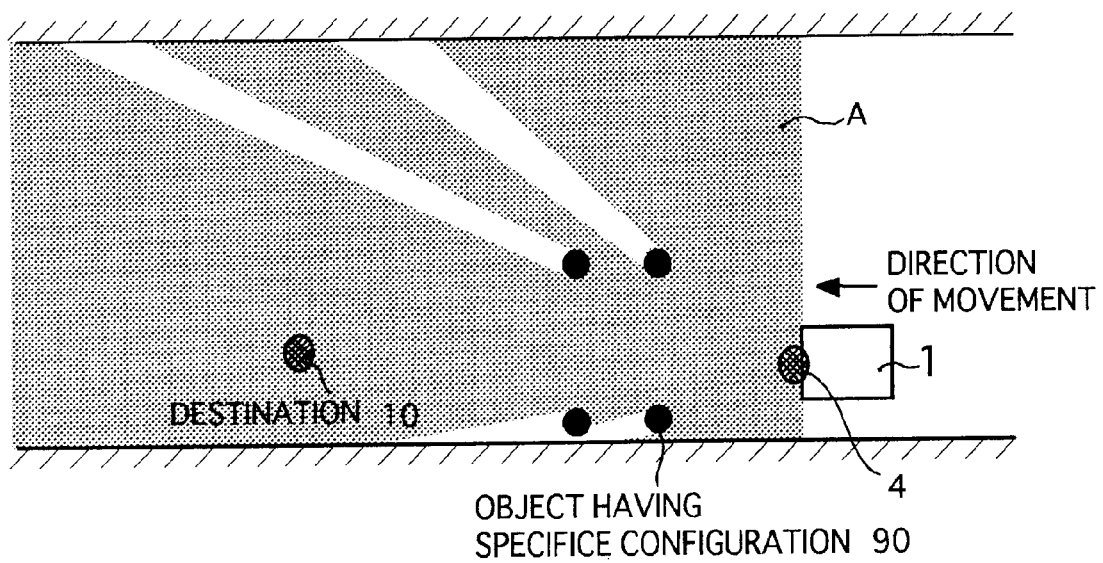
FIG. 4 is an illustration for explaining how the autonomous moving apparatus detects an obstacle having an upper structure.

If, here, the obstacle 9 is a specific-configuration object 90, for example a columnar object such as a leg of a table, its upper structure, that is, a roof may not be detected by the radar device 4. In such a case, the radar device 4 outputs such a detection result as shown in FIG. 4. Although a dotted area A is considered to have no obstacle 9 therein, the specific-configuration object 90 causes the radar device 4 to provide a unique output. Utilizing this, the specific-configuration detecting element 6 detects a presence of a specific-configuration object (described later in detail).

Figure 5:
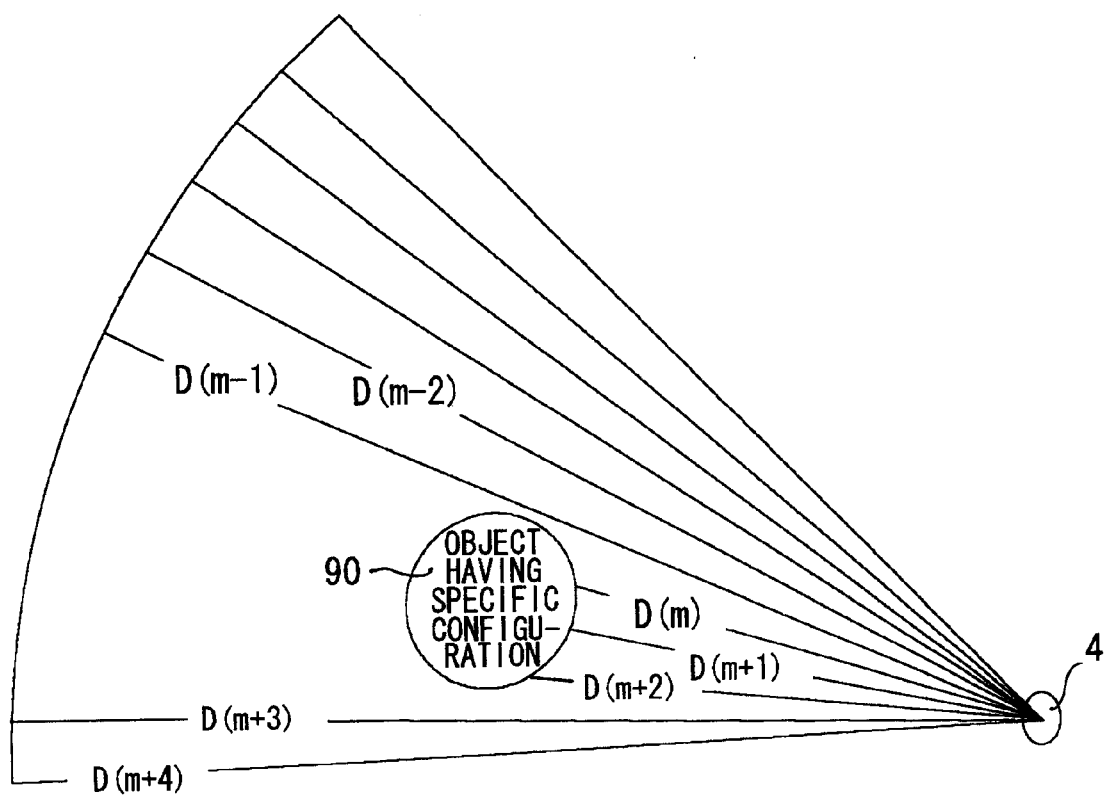
FIG. 5 is an illustration for explaining operations for recognizing a specific configuration of object.

The following will describe how to detect a presence of the specific-configuration object 90 with reference to FIG. 5. Supposing an interval in which distance data is sampled in scanning by the radar device 4 to be $\angle\theta$, an "i"th distance data piece as counted from $\theta=0$ is expressed as D(i). The presence of the specific-configuration object 90 has brought about such a detection output as given in a table below. In it, a difference between the "i"th distance data piece and the (i−1)th distance data piece is indicated by $\angle D$.

TABLE 2

| i | θ | Distance | ΔD = D(i) − D(i − 1) |
|---|---|---|---|
| ... | ... | ... | ... |
| m − 2 | i × Δθ | D(m − 2) | \|ΔD\| < DR |
| m − 1 | i × Δθ | D(m − 1) | \|ΔD\| < DR |
| m | i × Δθ | D(m) | ΔD <− DR |
| m + 1 | i × Δθ | D(m + 1) | \|ΔD\| < DR |
| m + 2 | i × Δθ | D(m + 2) | \|ΔD\| < DR |
| m + 3 | i × Δθ | D(m + 3) | ΔD > DR |
| m + 4 | i × Δθ | D(m + 4) | \|ΔD\| < DR |
| ... | ... | ... | ... |

Figure 6:
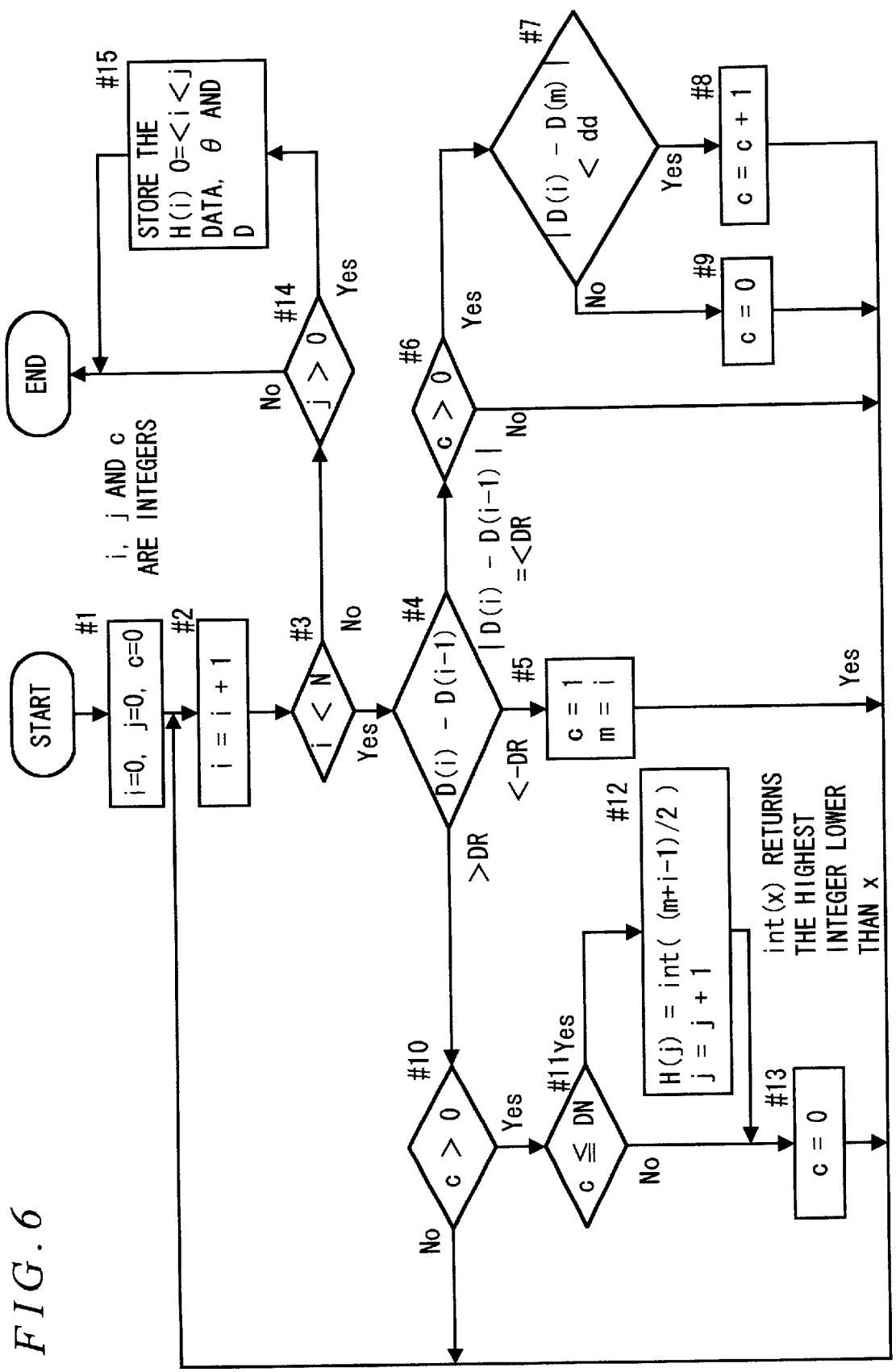
FIG. 6 is a flowchart for showing a process to recognize the specific configuration of object.

The specific-configuration detecting element 6 utilizes the above-mentioned change in detection output in such processing as shown by a flowchart of FIG. 6 to thereby detect a presence of the specific-configuration object 90 (in this case, columnar object). Here, it is supposed that if there is found such a plurality of data pieces that a difference between distances indicated by the adjacent data pieces exceeds a set value, a presence is guessed of such an object that protrudes forward and also that if a distance indicated by data pieces on both sides of the data of this guessed object is longer than a set distance value and continues as long as not more than a set width, a presence is guessed of the specific-configuration object 90. Those set values are stored in the memory 8 beforehand. The set values may be adapted to be switched according to an environment in which the autonomous moving apparatus moves.

The number N of radars oscillated per scan is given by $0 \leq i \leq N$. It is supposed that a set value of a difference between distances indicated by the adjacent data pieces required to guess the presence of a specific-configuration object is DR, a set value of a width required to decide a guessed specific-configuration object is DN, and a maximum value of a change in distance with respect to the radar device in a plane of the guessed specific-configuration object is dd (preset positive value). As for dd, if, for example, a specific configuration to be specified is a column and one column present has a largest radius rr, dd=rr can be set.

In FIG. 6, i represents an "i"th integer, j represents an integer value which is incremented by one each time a specific configuration is found in processing of N number of data pieces of one scanning, and c represents the number of radars whose light is reflected from one specific configuration. In the case of FIG. 5, c=3. If DN>c, a specific configuration is to be recognized.

In FIG. 6, for each processing routine, the value of i is incremented by 1 (#2), the magnitude of a difference $\angle D$ between distances indicated by the adjacent data pieces, that is, the magnitude of D(i)−D(i−1) is checked (#4). In the example of FIG. 5:

When i=m, D(m)−D(m−1)<−DR, so that the processing goes to #5 to provide c=1 and m=i;

When i=m+1, |D(m+1)−D(m)|≦DR and D((m+1)−D(m) <dd, so that the processing passes through #6, #7, and #8 to provide c=2;

When i=m+2, |D(m+2)−D(m)|≦DR and D((m+2)−D(m) <dd, c=3 is provided similarly; and When i=m+3, D(m+3)−D(m+2)>DR, the processing passes through #10, #11, and #12. int(x) is supposed to return a largest integer smaller than x. Here, only consecutive largest numbers are set. Thus, D(m), D(m+1), and D(m+2) are decided to be a distance obtained by a reflection from one specific configuration. A distance with respect to the specific configuration is supposed to be H(j)th distance (#12).

H(j)=int(m+m+2)/2)=m+1

Note here that at #9 and #13, c=0 is provided, that is, the value of c is reset.

When scanning is completed once, the data of a position (angle and distance) of a specific configuration detected when the process passes through #14 and #15 is stored.

When a specific configuration which is columnar is recognized and its position (θ, D) is stored by performing the processing of the above-mentioned flowchart each time the obstacle detection information is obtained for each scanning by the radar device 4, instead of shifting to an avoidance operation immediately, the process activates the obstacle sensor 5 (or power it ON so that it may be operative) for detecting an obstacle in a space different from a horizontal plane in a travelling direction.

Figure 7:
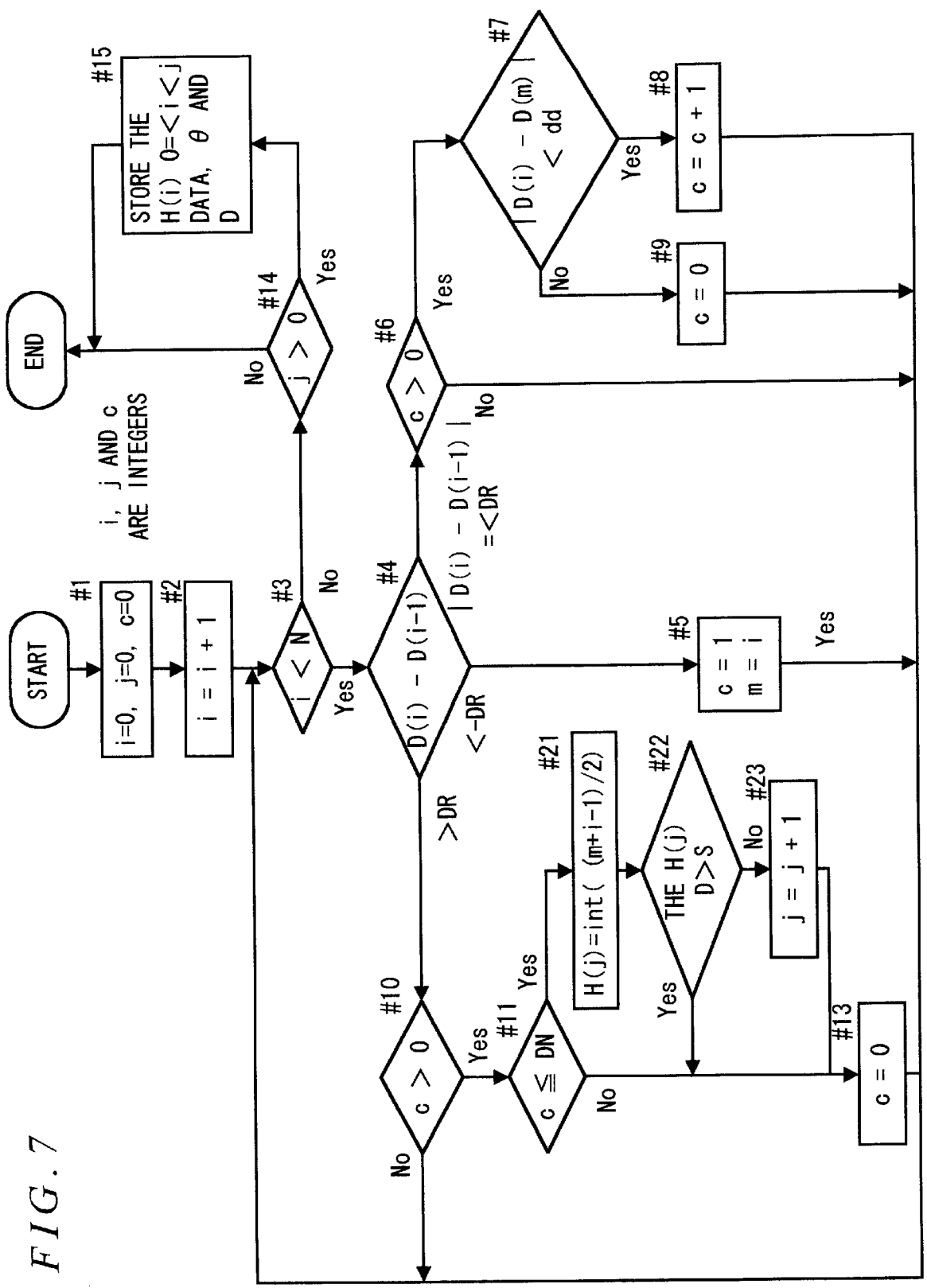
FIG. 7 is a flowchart for showing another embodiment to recognize the specific configuration of object.

FIG. 7 is a flowchart for showing processing by another embodiment, in which #12 of FIG. 6 is replaced by #21, #22, and #23. In this processing a distance S with respect to a specific configuration to be considered is preset to compare the distance data, for example, D(m+1) to S with each other, so that if the distance data is larger than S, the distance data is ignored. A specific-configuration object to be considered, if any, is stored last by incrementing the value of j.

Note here that the value of DN may be fixed or changed for each distance value by supposing beforehand the size of a specific configuration. In this case, the size of a detection-subject object that can be guessed from one distance data piece is supposed to be D(i) x sin($\angle\theta$). The size of a specific configuration shown in FIG. 5 is guessed to be D(m) x sin($\angle\theta$) x c. Here, supposing the largest width of the specific configuration to be Omax, the value of DN at a distance x is a smallest integer not less than Omax/x/sin($\triangle\theta$).

Although the process recognizes also a position of the specific-configuration object 90 in the flowchart of FIGS. 6 and 7, the process may only decide the presence/non-presence of a specific-configuration object in the travelling direction.

In a further embodiment, it may be that the obstacle sensor 5 may be activated only when the apparatus recognizes a specific-configuration object and then comes near it within a predetermined distance. This is effective when a largest value can be specified as measured from a leg of a table or chair, etc. to an end of an overhung portion.

Further, when a specific configuration is detected by the specific-configuration detecting element 6, the process may once validate a routine for decreasing the speed of autonomous movement. This enables the apparatus to stop and avoid the obstacle 9 which may have an upper structure, even if it was detected by the obstacle sensor 5 nearby.

Also, such a routine may be validated that presets a smallest distance with respect to the obstacle 9 which the autonomous moving apparatus can get near it so that the apparatus cannot get near it within that distance. This enables the autonomous moving apparatus 1 to avoid colliding with an obstacle not having a specific configuration but having an upper structure, for example, a counter or rail.

Figure 8A:
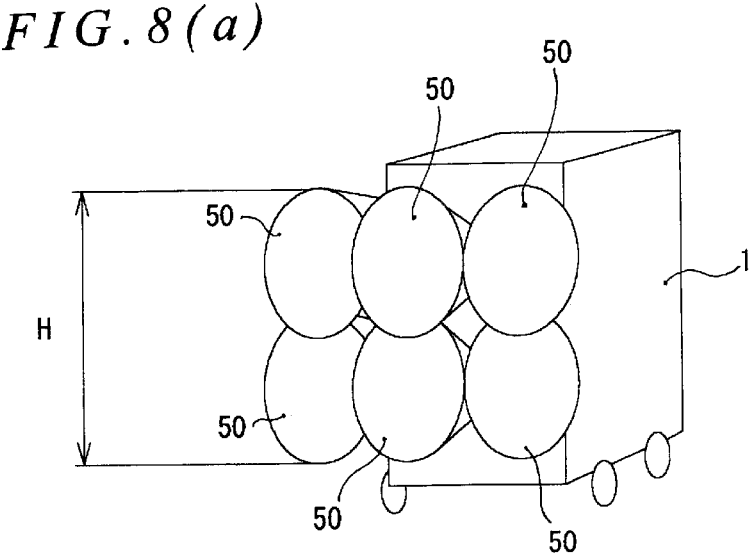
FIGS. 8(a), 8(b), and 8(c) are perspective, plan, and side views respectively for showing a further embodiment of an obstacle sensor of the autonomous moving apparatus.
Figure 8B:
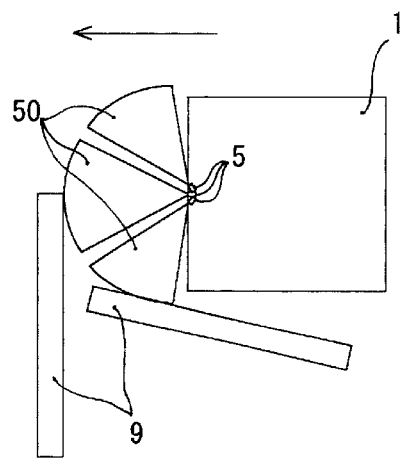
Figure 8C:
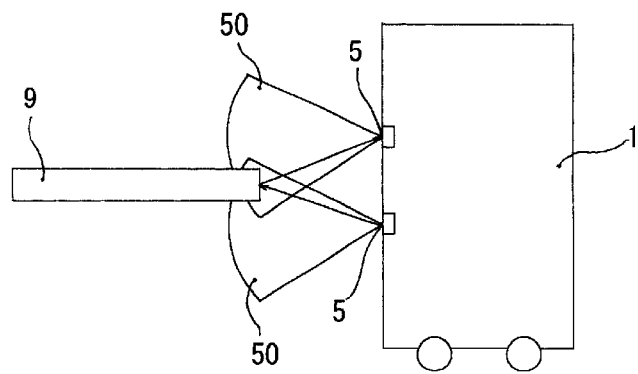

If a supersonic sensor is used as the obstacle sensor 5, as shown in FIG. 8(*a*), the sensor is to be arranged so that it can detect any obstacle within a possible height H of the upper structure in its detection area 50. In this case, as shown in FIG. 8(*b*), by arranging this plurality of supersonic sensors (obstacle sensors 5) so that they may give a semi-circled comprehensive obstacle detecting area 50 in the horizontal plane in the travelling direction, the autonomous moving apparatus 1 can detect the obstacle 9 by the obstacle sensors 5 no matter at which angle with respect to the upper structure the autonomous moving apparatus 1 gets near it.

Also, as shown in FIG. 8(*c*), when the obstacle sensor 5 is arranged at upper and lower positions and if these two upper and lower obstacle sensors 5 and 5 are synchronized with each other to provide the same timing at which they emit a supersonic wave, one of the sensors can detect a supersonic wave which is emitted by another sensor and reflected by the obstacle 9, thus enhancing an accuracy of detecting the presence/non-presence of a vertical obstacle.

Although the figure shows a state where an end face of the obstacle 9 is detected which obstacle is at an intermediate height between the vertical obstacle sensors 5 and 5, the obstacle 9 which is not at the intermediate height between them can also be detected when this end face is usually is curved or inclined. Also, a supersonic sensor used as the obstacle sensor 5 may be of a transmission-and-reception combined type or a transmission-or-reception alone type.

Figure 9A:
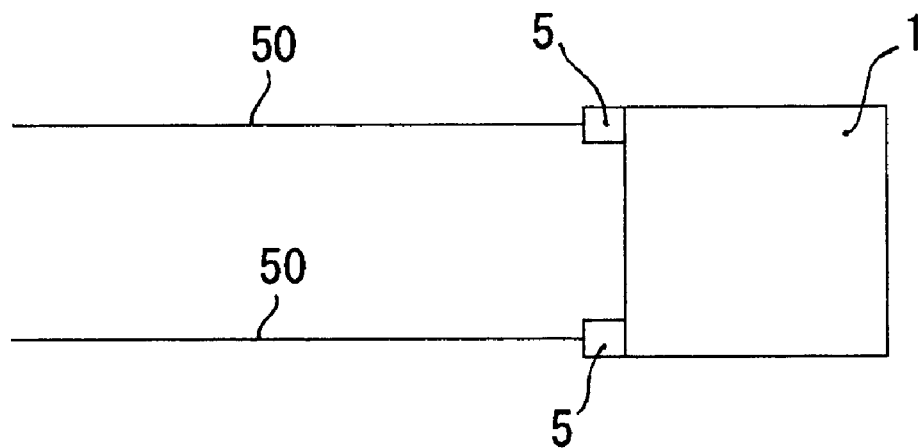
FIGS. 9(a) and 9(b) are plan and side views respectively for showing the further embodiment of the obstacle sensor.
Figure 9B:
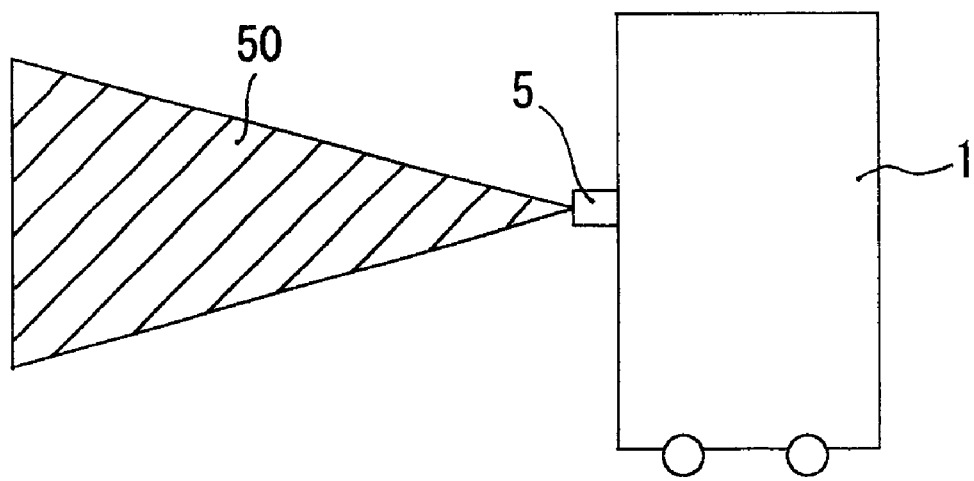

As the obstacle sensor 5, as shown in FIGS. 9(*a*) and 9(*b*), such an optical sensor that emits a vertically-spreading slit light 50 to then detect an obstacle with its reflected light from it may be used and disposed at both ends of the autonomous moving apparatus 1 in its width direction.

Figure 10A:
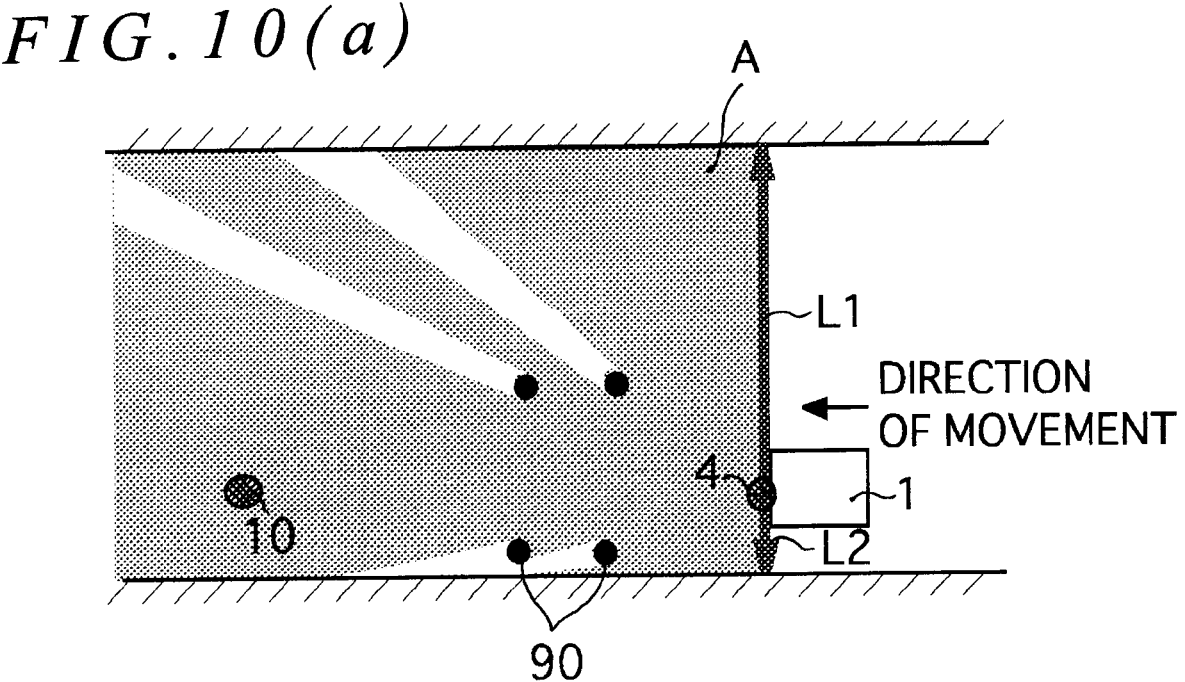
FIGS. 10(a) and 10(b) are illustrations for explaining operations of the autonomous moving apparatus.
Figure 10B:
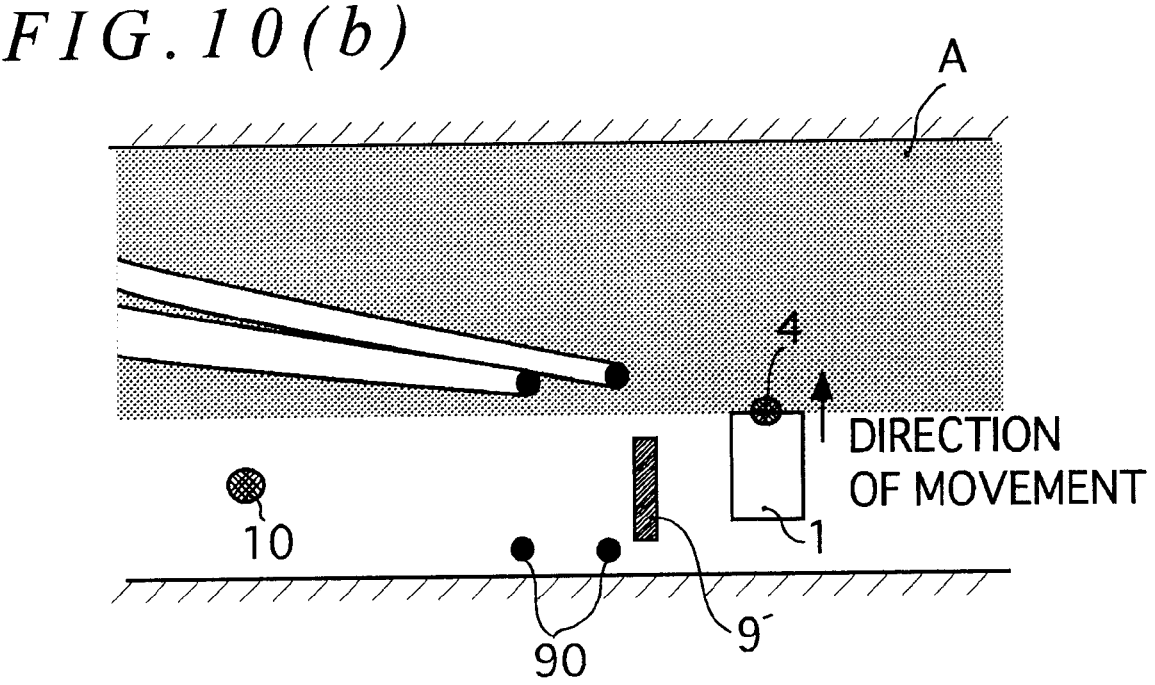
Figure 11A:
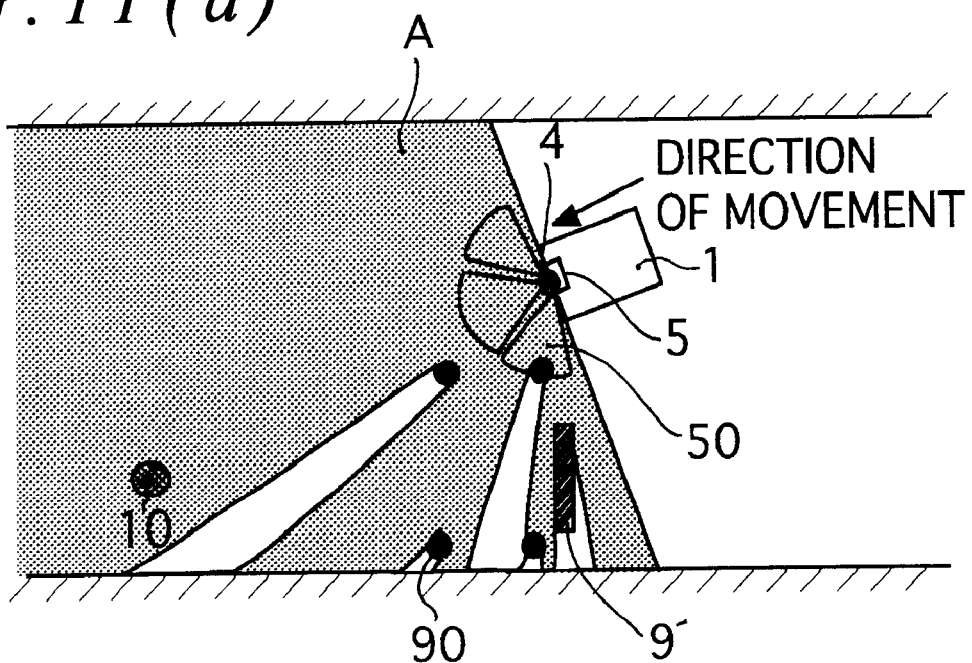
FIGS. 11(a) and 11(b) are also illustrations for explaining operations of the autonomous moving apparatus.
Figure 11B:
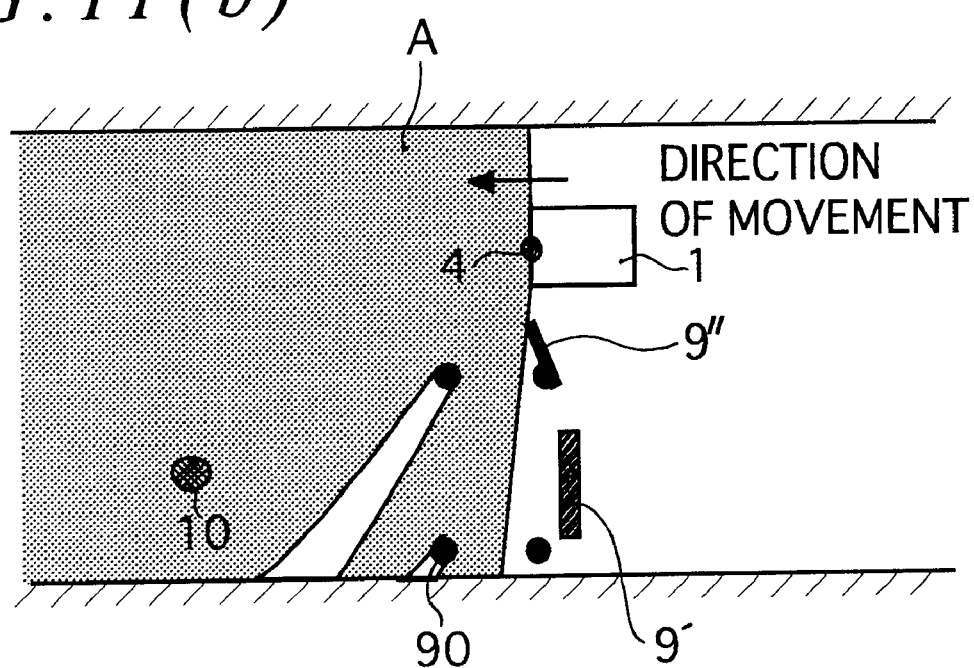

The following will describe avoidance operations of the autonomous moving apparatus when a specific-configuration object is detected, with reference to FIGS. 10 and 11. When a specific-configuration object was detected, the obstacle sensor 5 is activated or put into an operative state and, also when an obstacle detection output could be obtained from the obstacle sensor 5, the apparatus turns in a predetermined direction and restarts autonomous movement immediately when there is no obstacle detected in the scanning plane.

For example, as shown in FIG. 10(*a*), if the specific-configuration object 90 was detected and then an obstacle detection output could be obtained from the obstacle sensor 5 (not shown), the travelling device 2 is once stopped and, as shown in FIG. 10(*b*), a virtual obstacle 9' is set in front of the autonomous moving apparatus 1. The size of thus set virtual obstacle 9' and its distance with respect to the autonomous moving apparatus 1 are to be set in the memory 8 like the other settings. Also, although the figure shows the virtual obstacle 9' in a rectangle, it may be a string of dots evenly spaced. Next, the autonomous moving apparatus 1 is turned until there is no virtual obstacle 9' detected. The turning direction is an angle of either of two data pieces L1 and L2 (FIG. 10(*a*)) of θ=0° and θ=180° in a horizontal plane of the radar device 4 whichever has a larger distance with respect to the obstacle (wall). In this case, the apparatus is turned rightward. If the virtual obstacle 9' disappears when the autonomous moving apparatus 1 is thus turned, it advances in the direction and, immediately when there is no obstacle detected in the scanning plane, restarts autonomous movement. The specific-configuration detecting element 6 stores in the memory 8 a position of the obstacle 9 as a virtual obstacle 9' before restarting. The information of this position may be coordinates of a dot string indicating the obstacle. Then, each time the radar device 4 scans the horizontal plane, resultant scan data of the horizontal plane is superimposed on the stored data of the virtual obstacle 9', based on which the apparatus avoids the obstacle.

As shown in FIG. 11(*a*), the autonomous moving apparatus 1 may be thus turned until there is no obstacle detection output from the obstacle sensor 5 in the opposite direction when any one of a plurality of the obstacle sensors 5 disposed at the right and left sides of the autonomous moving apparatus 1 having the respective detection areas 50 in the right and left forward directions detected the obstacle. In such a way, the apparatus can avoid the obstacle efficiently. In this case also, as shown in FIG. 11(*b*), a new virtual obstacle 9'' is set and stored, so that the apparatus restarts autonomous movement immediately when there is no obstacle detected in the scanning plane.

Figure 12:
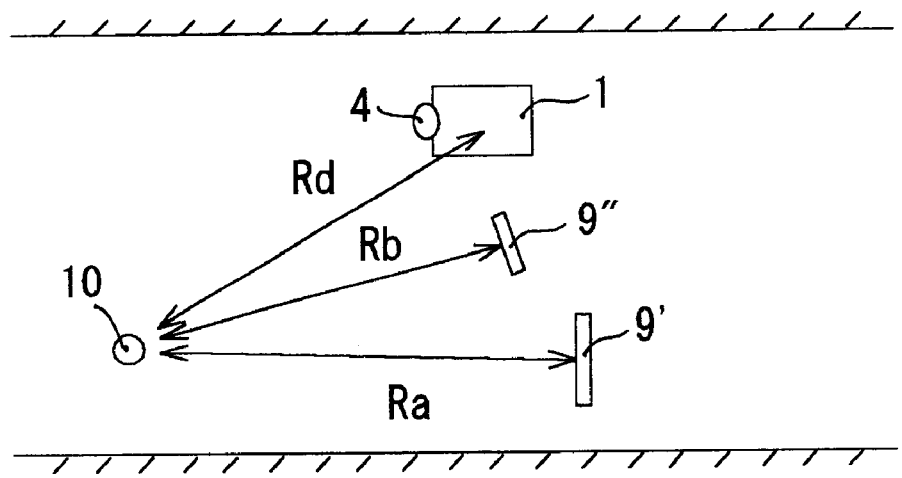
FIG. 12 is an illustration for explaining operations of the autonomous moving apparatus.

After the autonomous movement apparatus 1 restarted autonomous movement, as shown in FIG. 12, the process compares a distance Rd between the autonomous movement apparatus 1 and the destination 10 to distances Ra and Rb between the set virtual obstacles 9' and 9'' and the destination 10 and, if the distances Ra and Rb are larger than the distance Rd, erases the stored position information of the set virtual obstacles 9' and 9'' (if Rb<Rd<Ra, the information of the virtual obstacle 9' with the distance Ra is erased). Thus, calculation processing can be mitigated which is required to avoid the obstacle in autonomous movement.

Figure 13:
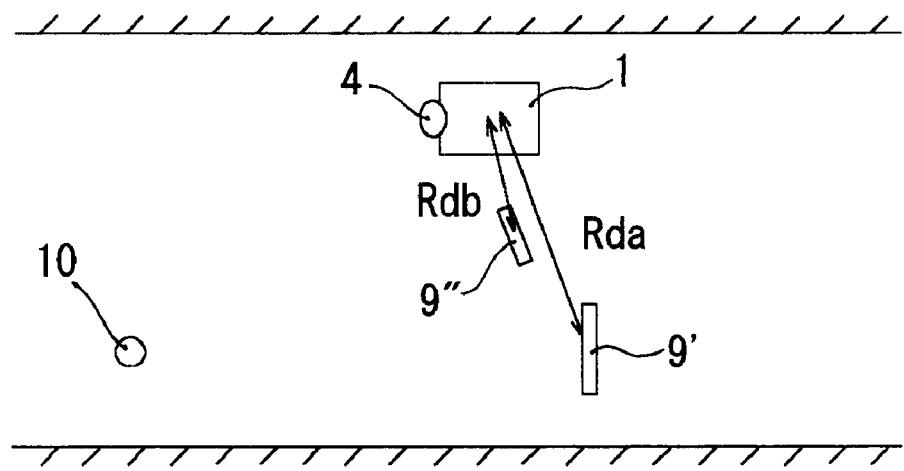
FIG. 13 is an illustration for explaining operations of the autonomous moving apparatus.
Figure 15A:
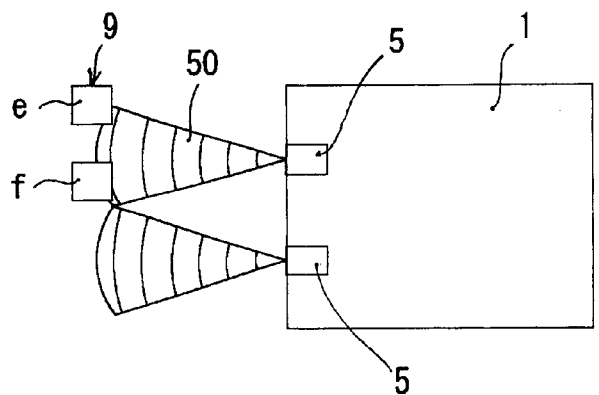
FIGS. 15(a), 15(b), and 15(c) are illustrations for explaining a conventional apparatus.
Figure 15B:
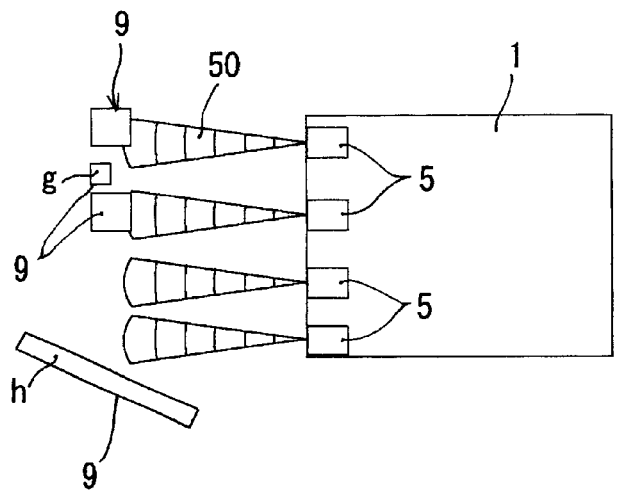
Figure 15C:
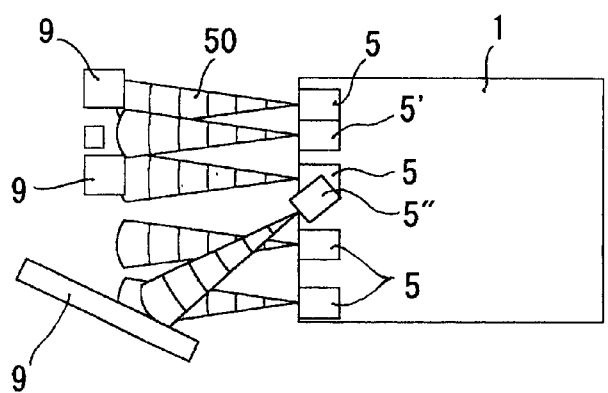
Figure 16A:
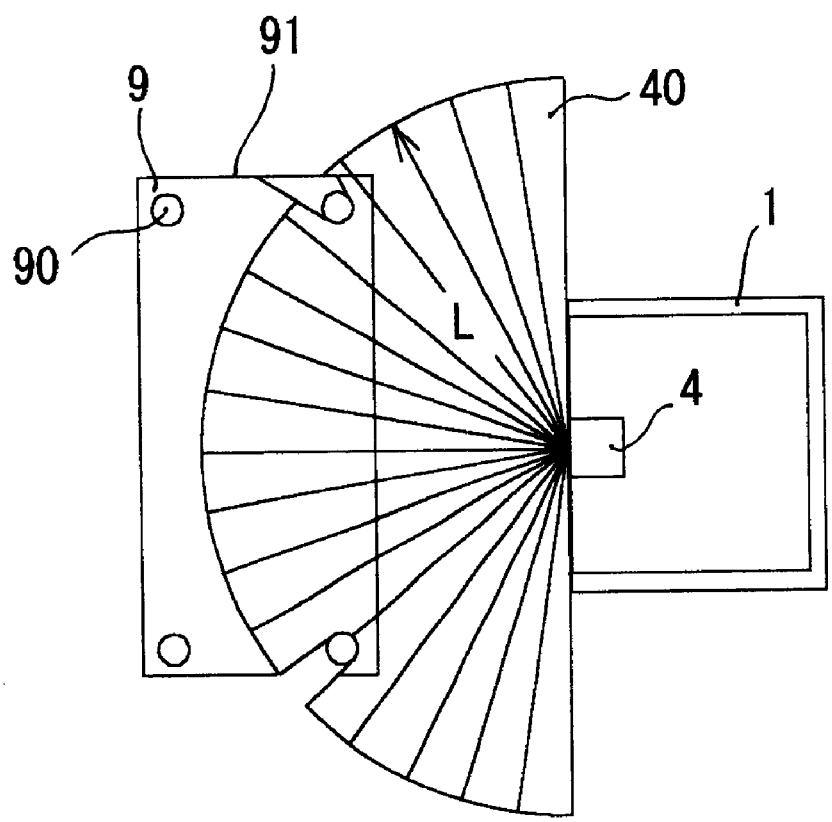
FIGS. 16(a) and 16(b) are plan and side views respectively of another conventional apparatus.
Figure 16B:
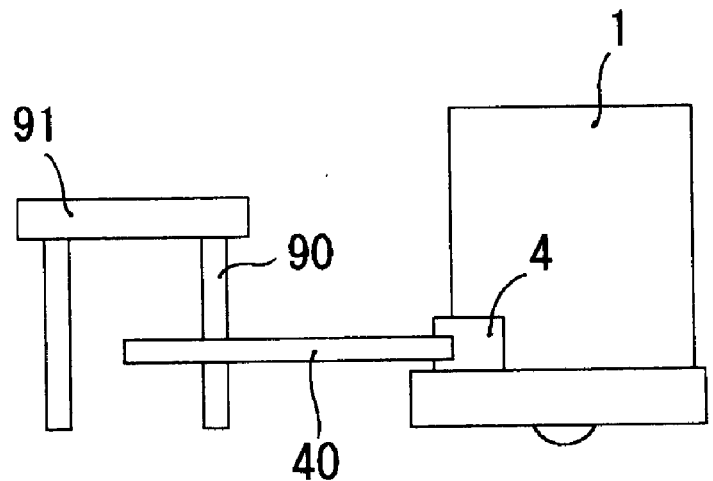

As shown in FIG. 13, in this erasure processing, the stored position information of the set virtual obstacle 9' may be erased if distances Rda and Rdb between the autonomous moving apparatus 1 and the virtual obstacles 9' and 9'' are larger than a preset distance Rset (if Rda>Rset>Rdb, the information of the virtual obstacle 9' with the distance Rda is erased). Thus, almost the same effects as above can be obtained.

There may be a case where the obstacle is movable. To accommodate such a case, when a specific-configuration object is detected, values of the (H(i)[0≦i<j])th data pieces θ and D in the flowchart of FIG. 6 or 7 are stored and then, for a preset time lapse, the autonomous moving apparatus 1 is stopped, after which the obstacle, that is, a specific-configuration object is recognized again in the scanning plane by the radar device 4. If the (H(i)[0≦i<j])th data pieces θ and D are obtained again, they are compared to the previous data pieces θ and D respectively and, if they disagree, the process decides that the obstacle is a moving object and permits the autonomous moving apparatus 1 to stay in the stopped state for a predetermined time lapse while continuously operating the radar device 4 and the obstacle sensor 5 periodically. As a result, if there is no change detected in the distance with respect to the obstacle, the process decides that the obstacle has stopped, thus restarting the autonomous movement.

Also, if the comparison to the previous data is limited to a distance of the distance D smaller than a preset value, the process can involve only such movement of the object that has an influence on the movement of the autonomous moving apparatus 1.

Instead of preparing a special avoidance algorithm for avoidance, the apparatus may continue autonomous movement based on information of the output of the radar device 4 on which the output of the obstacle sensor 5 is superimposed. That is, when the radar device 4 detects a specific-configuration object and then the obstacle sensor 5 detects its upper structure, the output of the obstacle sensor 5 may be superimposed on the output of the radar device 4 to thereby handle the information detected by the obstacle sensor 5 as if it was obtained at the radar device 4 in order to continue autonomous movement operations, thus committing the avoidance algorithm provided to the program for autonomous movement to perform avoidance operations. For example, when a specific-configuration object was detected by the radar device 4 and then its upper structure was detected by the obstacle sensor 5, an output of the radar device 4 is processed with a predetermined radius r in the detection area of the obstacle sensor 5 or a detected distance for each scanning angle of the radar device 4 whichever smaller to thereby commit the continuous operation of autonomous movement to the autonomous movement program including the obstacle avoidance algorithm. The radius r may be a distance detected by the obstacle sensor 5 if it can do so or of a preset value if it can detect only the presence/non-presence of the obstacle 9.

The above description is further detailed with reference to FIGS. 14(a), 14(b), and 14(c). Here, the specific-configuration object 90 is supposed to be a columnar object such as a leg extending downward from an upper structure 91 such as a roof of a table. The obstacle sensor 5 includes a plurality of area sensors (A, B, C) oriented in different directions within a travelling direction. First, in FIG. 14(a), only the radar device 4 detects the specific-configuration object 90. In the figure, a detection area 40 of the radar device 4 is dotted. R indicates a distance detected in scanning. When the specific-configuration object 90 is thus detected, as shown in FIG. 14(b), detection information of the obstacle sensor 5 is validated. Its detection area 50 is hatched. In the figure, the obstacle sensor 5(B) detects the obstructing upper structure 91, that is, the roof of a table. As shown in FIG. 14(c), an output of the obstacle sensor 5 is superimposed on an output of the radar device 4. Accordingly, the detection information of the obstacle sensor 5 can be handled as if it was detected at the radar device 4, thus permitting continuous autonomous movement. If the obstacle sensor 5 can detect a distance also, the obstacle can be detected at such a distance. In this example, an output of the radar device 4 is processed so that the obstacle was apparently detected at a position of the radius r in the detection area of the obstacle sensor 5(B). If the sensor can detect only presence/non-presence of the obstacle, a preset value is used.

The autonomous moving apparatus 1 having such a configuration as described above can be used as a robot appropriately for conveyance, security, cleaning, etc. in such an environment as an office, a hospital, or a restaurant, where there are many obstacles such as tables or chairs.

Although the detection area by the radar device 4 is shown as a rectangle in FIGS. 3, 4, 10, and 11 to give an image of a wall in a passage such as a corridor, the invention is not limited to it. Also, although the above description has involved the radar device 4 only one, it may be given two or more.

Thus, the invention has the following effects:

1. When an detection output of a specific configuration is obtained, the apparatus can decrease its travelling speed to thereby stop or avoid an obstacle having an upper structure even if the obstacle sensor has a small detection distance.

2. If the apparatus is not permitted to enter into a range of a predetermined distance with respect to an obstacle detected by the radar device, the invention is effective for the apparatus to avoid such an obstacle that does not have a specific configuration but has an upper structure.

3. If a supersonic sensor, which is cost-effective as used as the obstacle sensor, is arranged more than one so that their comprehensive obstacle detection area may be of a semicircle shape in a horizontal plane in the travelling direction, no matter at what angle the apparatus gets near the upper structure, it can be detected, also, if a plurality of vertically disposed supersonic sensors has their respective oscillation timing synchronized with each other, the obstacle can be detected efficiently, thus enabling a reduction in the number of required obstacle sensors.

4. Besides a supersonic sensor, an optical sensor may be used as the obstacle sensor cost-effectively, which is disposed at both ends in a width direction for emitting a vertically spreading slit light and receiving a reflected light from an obstacle to detect it.

5. In avoidance, based on the information of an output of the obstacle sensor which is superimposed on an output of the radar device, autonomous movement is continued to thereby commit an avoidance operation to an avoidance algorithm of a program for autonomous movement, thus enabling autonomous movement while avoiding an obstacle without using a separate avoidance algorithm.

6. The apparatus turns its travelling direction based on an output of obstacle detection from the obstacle sensor until there is no obstacle detection output provided by the obstacle sensor in a predetermined direction and then restarts its autonomous movement or turns its travelling direction based on an obstacle detection output in either right or left direction from the obstacle sensor until there is no obstacle detection output provided in the opposite direction by the obstacle sensor and then restarts its autonomous movement, thus efficiently avoiding the obstacle by a simple method even without detecting an accurate position of the obstacle.

7. If, in the above-mentioned configuration, such a controller is used that sets an obstacle in a relevant direction and stores a position of an obstacle based on an obstacle detection output by the obstacle sensor and then erases this position information when it came near a destination beyond thus stored position or that sets an obstacle in a relevant direction and stores a position of the obstacle based on an obstacle detection output by the obstacle sensor and then erases this position information when it went far away from that position by a predetermined distance, it is possible to easily decide a point in time when unnecessary data should be erased in calculations necessary for the obstacle avoidance processing, to thereby reduce the load on this calculation processing, thus enabling high-speed avoidance.

8. The controller can be adapted to decide whether a specific-configuration object is moving based on a result of a plurality of times of detection output by the specific-configuration detecting element and, if it is moving, stop the apparatus and, otherwise, validate the detection information of the obstacle sensor, thus enabling avoiding collision with the moving object and preventing dead-locking of mutual avoidance in case the moving object is another autonomous moving apparatus.

9. The autonomous moving apparatus is well suited for use as a robot used for conveyance, security, cleaning, etc. in a building such as an office, a hospital, a restaurant, etc.

What is claimed is:

1. An autonomous moving apparatus moving to a destination while detecting and avoiding an obstacle, comprising:
   a scan-type sensor that scans a horizontal plane in a traveling direction to thereby detect a position of an obstacle;
   a non-scan-type sensor that detects, without scanning, an obstacle in a space different from the scanning plane scanned by the scan-type sensor;
   a specific-configuration detecting element that determines the presence of an object having a specific configuration based on detected-object distance information for each scanning angle of the scan-type sensor to thereby detect a preset specific configuration;
   an obstacle detecting element that determines an estimated position of an obstacle or an area where the obstacle is present based on detection information from both of the scan-type and non-scan-type sensors if any specific configuration is detected by the specific-configuration detecting element and, otherwise, determines an estimated position of the obstacle only based on detection information from the scan-type sensor; and
   a controller for controlling the autonomous moving apparatus to travel to the destination, based on the position of the obstacle obtained by the obstacle detecting element.

2. The autonomous moving apparatus according to claim 1, wherein the specific-configuration detecting element has a memory in which information for detecting a columnar object as a specific configuration is stored beforehand, so that based on a series of detected-object distance data pieces for each angle obtained from the scan-type sensor, the specific-configuration detecting element determines an estimated width of a detected object from such data pieces that a difference between distances indicated by adjacent data pieces is in a range set in the memory and, if the width of the detected object is thus in the range set in the memory and a distance indicated by data pieces on both sides of the estimated object data is larger than a distance set in the memory, decides that a configuration indicated by the data pieces is a specific configuration.

3. The autonomous moving apparatus according to claim 2, wherein if a distance with respect to a specific configuration detected by the specific-configuration detecting element is smaller than a value set in the memory, the obstacle detecting element determines an estimated position of an obstacle or an area where the obstacle is present based on detection information from both of the scan-type and non-scan-type sensors and, if the distance with respect to the specific configuration is larger than the value set in the memory or no specific configuration is detected, determines an estimated position of the obstacle only based on detection information of the scan-type sensor.

4. The autonomous moving apparatus according to claim 1, wherein the obstacle detecting element makes the non-scan-type sensor operative if there is a detection output provided by the specific-configuration detecting element.

5. The autonomous moving apparatus according to claim 1, wherein the controller decreases a traveling speed if there is a detection output provided by the specific-configuration detecting element.

6. The autonomous moving apparatus according to claim 1, wherein the controller provides control so that the autonomous moving apparatus may not be permitted to come near an obstacle detected by the scan-type sensor only within a range of a predetermined distance from the obstacle.

7. The autonomous moving apparatus according to claim 1, wherein the non-scan-type sensor is a set of supersonic sensors.

8. The autonomous moving apparatus according to claim 7, wherein the set of supersonic sensors are provided in such an arrangement as to provide a semi-circle shaped obstacle detection area in a horizontal plane in a traveling direction.

9. The autonomous moving apparatus according to claim 7, wherein the plurality of supersonic sensors are arranged vertically and have supersonic-wave oscillation timing settings thereof synchronized with each other.

10. The autonomous moving apparatus according to claim 1, wherein the non-scan-type sensor is an optical sensor and disposed at both ends of the apparatus in a width direction thereof, to emit a vertically spreading slit light and then detect an obstacle based on a reflected light from the obstacle.

11. The autonomous moving apparatus according to claim 1, wherein the controller controls autonomous movement based on information of an output of the scan-type sensor on which an output of the non-scan-type sensor is superimposed.

12. The autonomous moving apparatus according to claim 1, wherein based on an obstacle detection output provided by the non-scan-type sensor, the controller changes a direction of the apparatus until there is no obstacle detection output provided in a predetermined direction and then restarts autonomous movement.

13. The autonomous moving apparatus according to claim 12, wherein based on an obstacle detection output provided by the non-scan-type sensor, the controller sets an obstacle in a relevant direction and stores a position of the obstacle, to erase information of the position when the controller approaches a destination beyond the position.

14. The autonomous moving apparatus according to claim 12, wherein based on an obstacle detection output provided by the non-scan-type sensor, the controller sets an obstacle in a relevant direction and stores a position of the obstacle, to erase information of the position when the controller reaches a predetermined distance with respect to the position.

15. The autonomous moving apparatus according to claim 1, wherein based on an obstacle detection output provided in either right or left direction by the non-scan-type sensor, the controller changes a direction of the apparatus until there is no obstacle detection output provided in the opposite direction and then restarts autonomous movement.

16. The autonomous moving apparatus according to claim 1, wherein based on a detection result of a plurality of detections by the specific-configuration detecting element, the controller decides whether a specific-configuration object is moving and, if the controller decides that the specific-configuration detecting element is moving, stops the traveling of the apparatus and, otherwise, validates detection information of the non-scan-type sensor.

17. The autonomous moving apparatus according to claim 1, wherein the apparatus is applied to a robot for use in conveyance of products, cleaning, etc.

* * * * *